Jan. 6, 1959            K. WILFERT            2,867,238
ROTARY DISTRIBUTING VALVE FOR A MOTOR VEHICLE
HEATING AND VENTILATING SYSTEM
Filed July 16, 1953
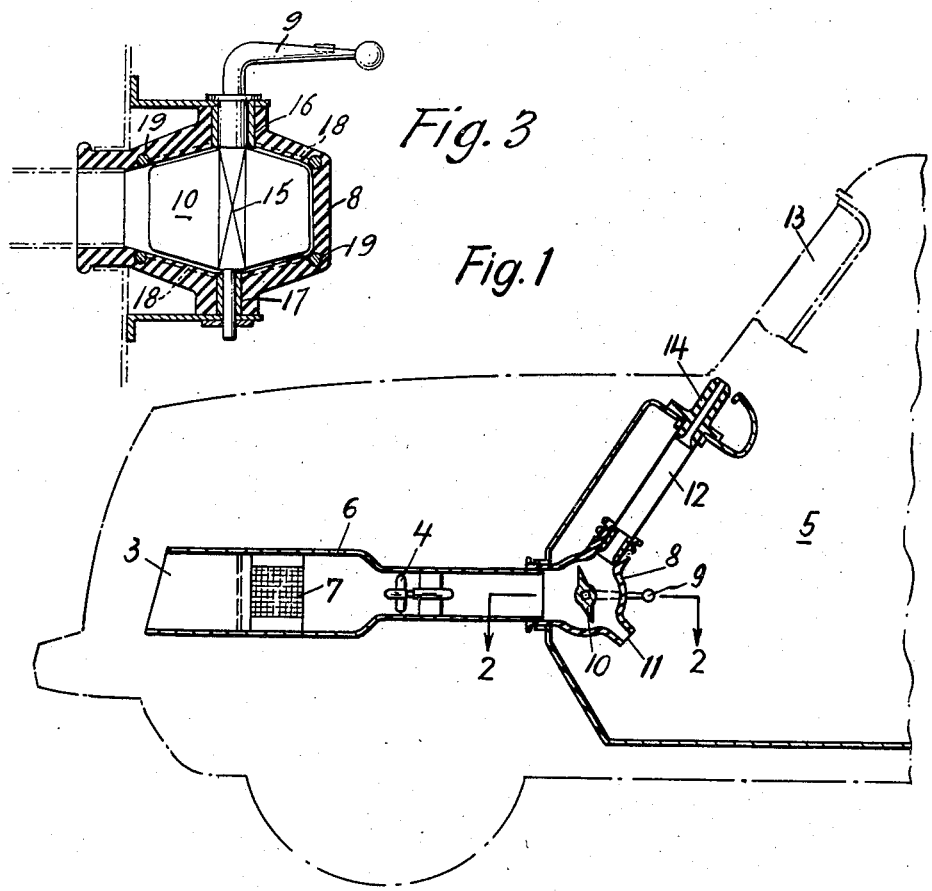
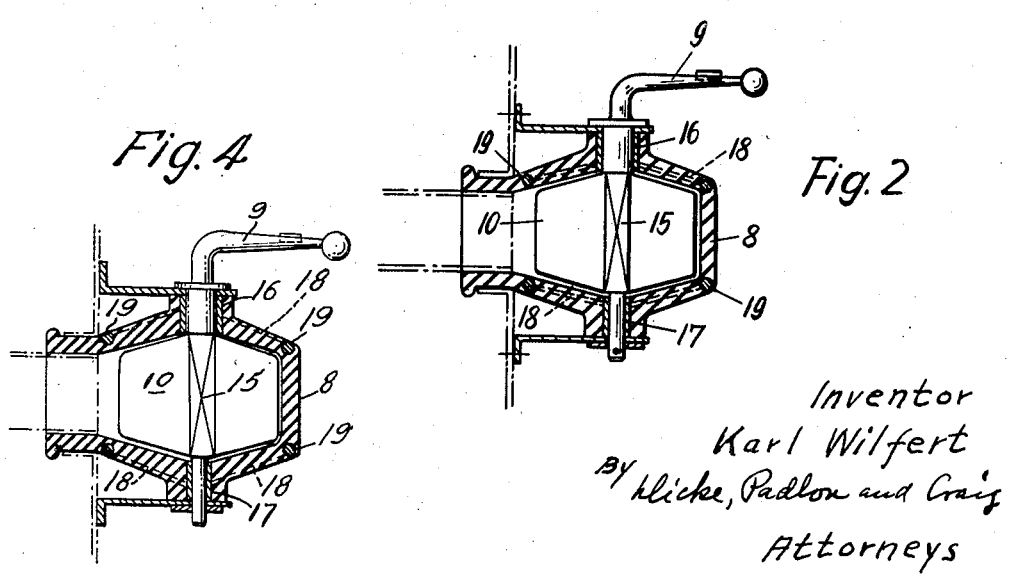
Inventor
Karl Wilfert
By Hlicke, Padlon and Craig
Attorneys United States Patent Office
2,867,238
Patented Jan. 6, 1959

2,867,238

ROTARY DISTRIBUTING VALVE FOR A MOTOR VEHICLE HEATING AND VENTILATING SYSTEM

Karl Wilfert, Stuttgart-Degerloch, Germany, assignor to Daimler-Benz Aktiengesellschaft, Stuttgart-Unterturkheim, Germany Application July 16, 1953, Serial No. 368,295

Claims priority, application Germany July 18, 1952

12 Claims. (Cl. 137—625.46)

The present invention relates to a heating and ventilating system, particularly for motor vehicles.

In such systems, as is well known, some conduit sections are made of sound-absorbing materials, for instance, rubber hoses, or lined with such materials. Such devices, however, do not completely eliminate sound waves originating, by way of example, from the air delivered by the blower and, along with the fresh air and/or the heating air, entering the room to be ventilated, since furthermore, the casings with their large surfaces as well as the nozzles and the edges of the shutters for controlling and distributing the air often form sources of singing air noises.

Accordingly it is an object of the present invention to avoid the occurrence of air noises.

According to the present invention, the walls of the devices for controlling and distributing the air within the heating and ventilating plant are made of sound-absorbing materials, for instance, soft rubber. For keeping up the stiffness of the concerned members of the device a structure or a cage, made of a metal, by way of example, may encircle the soft walls or may be arranged within them or embedded in the same. It is also appropriate, to make the controlling and distributing flaps in the devices of sound absorbing materials in the above mentioned way, so as to avoid an occurrence of air noises at the edges of the shutters or flaps.

Further objects, features, and advantages of the present invention will become more obvious from the following description when taken in connection with the accompanying drawing which shows, for purposes of illustration only, several embodiments in accordance with the present invention and wherein—

Fig. 1 is a longitudinal section through a heating and ventilating system constructed according to the present invention for a motor vehicle;

Fig. 2 is a sectional view along line 2—2 of Fig. 1;

Figure 3 is a sectional view similar to Figure 2 with the cage for supporting the walls of the casing being provided at the inside thereof; and Figure 4 is a sectional view similar to Figure 2 with the cage for supporting the walls of the casing being provided at the outside thereof.

The fresh air caught at the front end of the vehicle at 3 enters the interior 5 owing to the pressure head which appears when the vehicle is in motion and which if so desired may be aided by the effect of a small blower 4. In the air tube 6 made of any material a disconnectible heat exchanger 7 is inserted to warm up the entering fresh air in the cold season.

The casing 8 of a device to control and to distribute the entering fresh air is attached at the rear end of the air tube 6. In the casing 8 there is a regulating throttle 10 which is actuated by means of the handle 9 and which in the indicated position of Fig. 1 completely throttles the admission of air into the interior of the vehicle, whereas in other positions the air can flow either through the mouth 11 in the lower section of the interior of the vehicle or through the conduit 12 to one or several widespreading nozzles 14 discharging at the inner surface of the windscreen 13 or simultaneously to both of the said places.

Both the widespreading nozzles 14 and the casing 8 are made of soft rubber. At the places, where the shaft 15 of the throttle passes through the walls of the casing 8, there are metal bearing bushings 16, 17 inserted, from which spokelike metallic arms 18 proceed and spread outwardly, which are connected by metal rings 19 at their outer ends as shown in Fig. 2.

In producing the casing 8 the skeleton formed by the metal parts 16, 17, 18 and 19 is initially embedded in the walls of the casing. Instead of this construction a metal structure similar to a cage for supporting the walls may also be provided at the inside as shown in Fig. 3 or at the outside of the walls of the casing as shown in Fig. 4. At the walls of the widespreading nozzles 14 there may also be provided corresponding stiffening members.

In the example of construction the throttle 10 is also made of rubber having, however, a slightly harder texture than the walls of the casing 8.

In place of rubber any other sound-absorbing material, for instance, soft plastics, may be used for the parts 8, 10 and 15. The stiffening members 16, 17, 18 and 19 may also consist of hard rubber or of hard plastics instead of metal.

What is claimd is:

1. Control device for heating and ventilation systems in motor vehicles comprising a casing with fluid passages formed of sound-absorbing material and stiffened with reinforcing parts, a control member rotatably supported in said casing to control the flow through said fluid passages, metallic bushings embedded in said casing for supporting therein said control member, said reinforcing parts including metallic spoke-like arms spreading outwardly from said bushings, and metallic rings interconnecting the free ends of said spoke-like arms.

2. The control device for heating and ventilating systems in motor vehicles according to claim 1, wherein said control member is also made of sound-absorbing material.

3. The control device for heating and ventilating systems in motor vehicles according to claim 1, wherein said control member is rotatably supported in said casing by a shaft journaled in said bushings, said shaft being made of synthetic sound-absorbing material.

4. Control device for heating and ventilating systems of motor vehicles comprising a casing with fluid passages formed of sound-absorbing material and provided with reinforcing parts, a control member rotatably supported in said casing to control the flow through said fluid passages, bearing bushings in said casing for supporting said control member, said bearing bushings being formed of hard plastic material and being embedded in said casing, and said reinforcing parts including spoke-like arms made of hard plastic material and spreading outwardly from said bushings and at least one ring made of hard plastic material interconnecting the free ends of said arms.

5. A heating and ventilating system for motor vehicles, said system comprising a distributing device with outlet means to which fresh air or heated air is selectively fed, ducts leading to and from said distributing device, said distributing device comprising a casing with fluid passages formed of sound-absorbing material and reinforced with reinforcing means, control means in said distributing device for selectively and alternately directing said air to said outlet means or for stopping the flow of said air entirely or partially, bushing means embedded in said casing for rotatably supporting therein said control means, said reinforcing means including spoke-like arms radiating from said bushing means, said ducts and said controlling means also consist of soft and sound-absorbing material.

6. A heating and ventilating system for motor vehicles according to claim 5, wherein said casing is drum-shaped having an axis disposed in an essentially horizontal direction and wherein the axis of rotation of said control means is disposed within said casing in a horizontal direction.

7. A heating and ventilating system for motor vehicles according to claim 5, said control means comprising a control member mounted on a shaft rotatably supported in said casing, said shaft extending beyond said casing and terminating in a handle disposed perpendicularly to said shaft for adjusting said control member, said reinforcing means including rings interconnecting the free ends of said spoke-like arms.

8. A heating and ventilating system for motor vehicles, said system comprising duct means provided with selectively operable air controlling and distributing control means including a distributing valve selectively controlling the flow from an inlet to a plurality of outlets, said distributing valve comprising a casing with fluid passages formed of sound-absorbing material and reinforcing means reinforcing the same, a control member rotatably supported in said casing to control the flow through said fluid passages, bushing means embedded in said casing for supporting therein said control member, said reinforcing means including spoke-like arms radiating from said bushing means, the walls of said duct means being also made of sound-absorbing material.

9. A heating and ventilating system for motor vehicles, said system comprising duct means provided with selectively operable air controlling and distributing control means including a distributing valve selectively controlling the flow from an inlet to a plurality of outlets, said distributing valve comprising a casing with fluid passages formed of soft rubber and reinforcing means reinforcing the same, a control member rotatably supported in said casing to control the flow through said fluid passages, bushing means embedded in said casing for supporting therein said control member, said reinforcing means including spoke-like arms radiating from said bushing means and ring means interconnecting the free ends of said spoke-like arms, the walls of said duct means being also made of soft rubber.

10. A heating and ventilating system according to claim 8, wherein said reinforcing means is embedded in the walls of said fluid passages.

11. A heating and ventilating system according to claim 8, wherein said reinforcing means encircles the walls of said fluid passages.

12. A heating and ventilating system according to claim 8, wherein said reinforcing means is arranged at the inner surface of the walls of said passages.

References Cited in the file of this patent

UNITED STATES PATENTS

| | | |
|---|---|---|
| 1,251,453 | Spencer | Dec. 25, 1917 |
| 1,579,140 | Phillips | Mar. 30, 1926 |
| 1,977,351 | Phillips | Oct. 16, 1934 |
| 2,164,057 | Fink | June 27, 1939 |
| 2,287,867 | Daiger | June 30, 1942 |
| 2,390,026 | Hosking | Nov. 27, 1945 |

FOREIGN PATENTS

| | | |
|---|---|---|
| 362,953 | Great Britain | of 1931 |